Nov. 19, 1968  J. L. ANDERSON  3,412,247
MEANS OF DETECTION OF SURFACE CONTAMINANTS UTILIZING
A VOLATILE RADIOACTIVE CHEMICAL
Filed Nov. 5, 1965  6 Sheets-Sheet 1

INVENTOR
John Lynde Anderson
BY C. W. Mortenson
ATTORNEY

INVENTOR
John Lynde Anderson
BY C. W. Mortenson
ATTORNEY

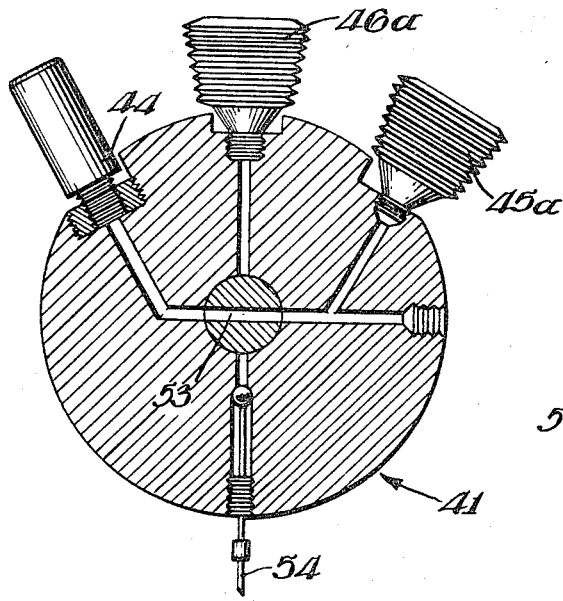
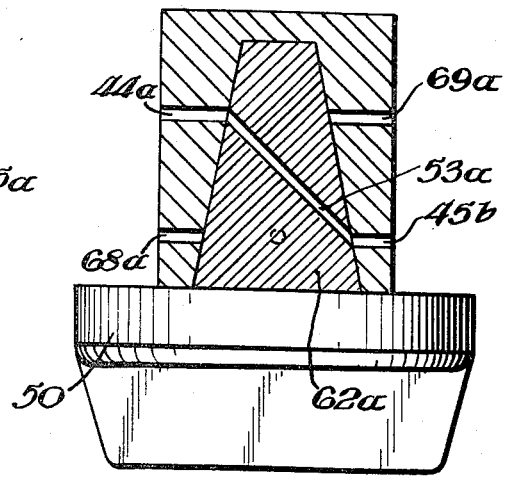
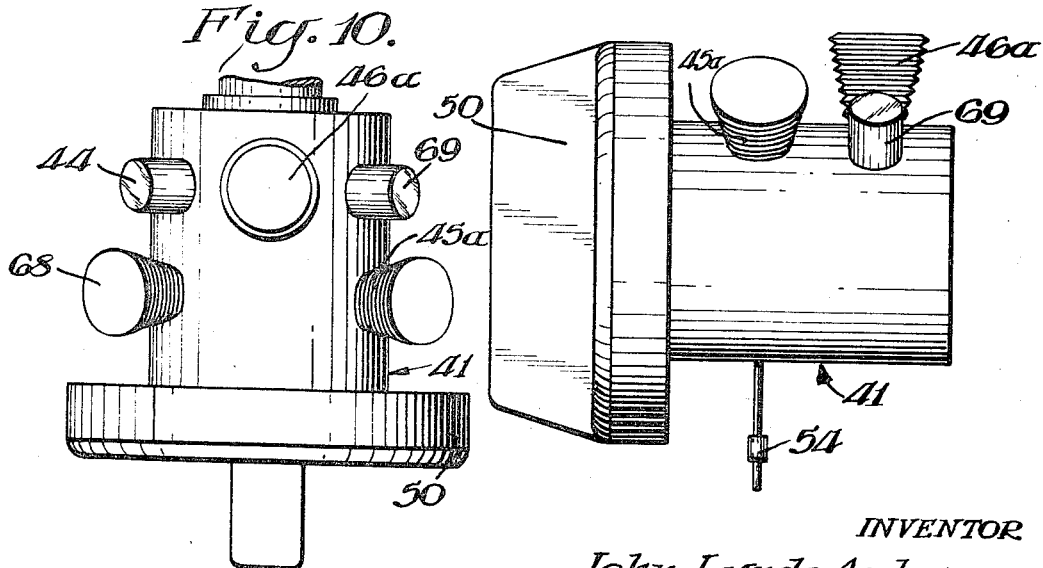

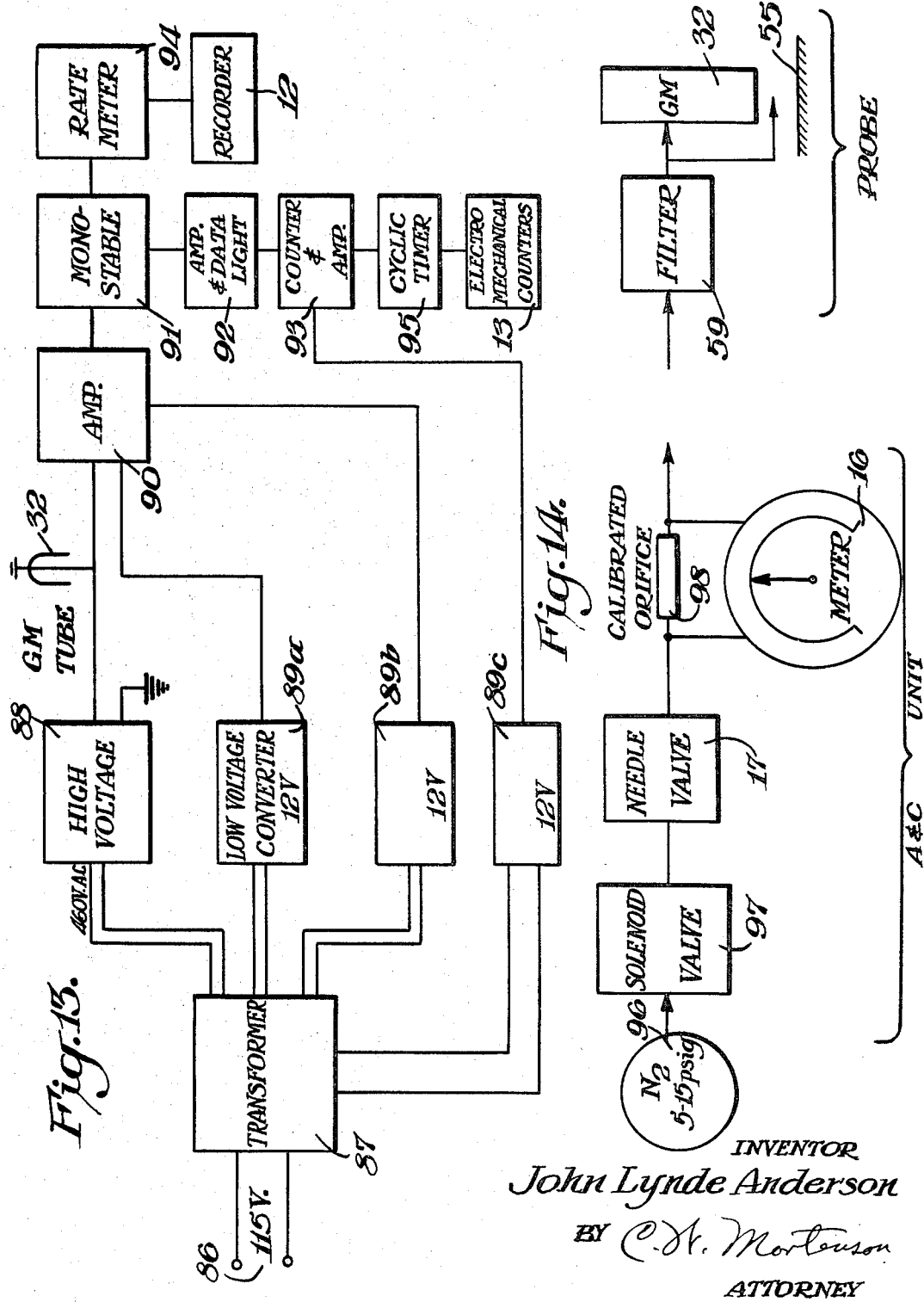

Fig.16. Background Reading
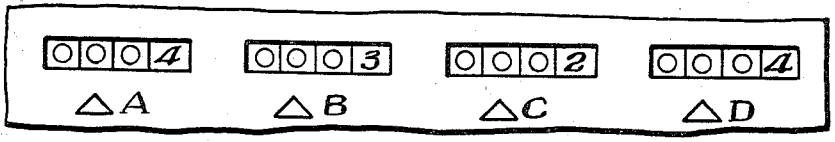
Fig.16A. Test of Validity (Clean)
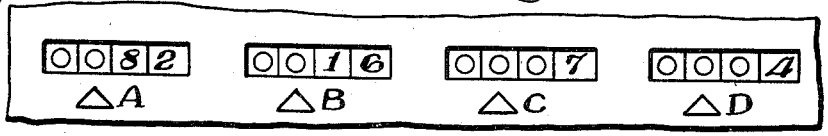
Fig.16B. Reading of fingerprint smudge
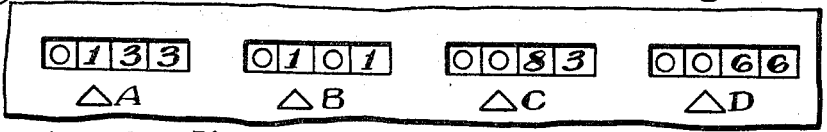
Fig.16C. Reading after fingerprint is wiped off
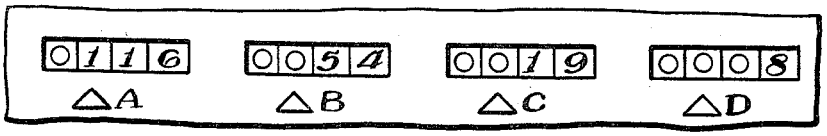
Fig.15.
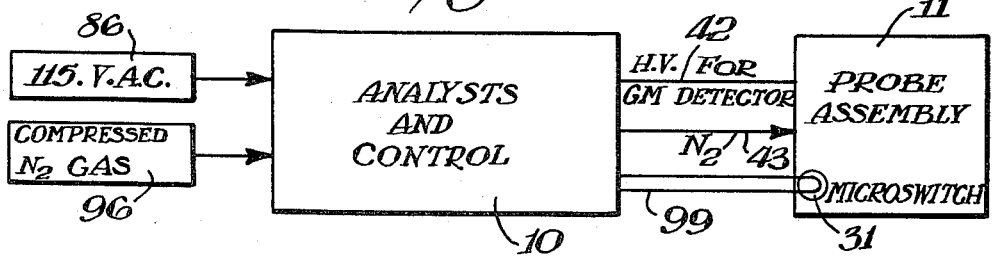
Fig.17.
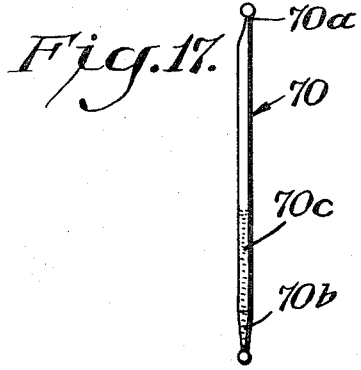
INVENTOR
John Lynde Anderson
BY C. H. Mortenson
ATTORNEY Nov. 19, 1968    J. L. ANDERSON    3,412,247
MEANS OF DETECTION OF SURFACE CONTAMINANTS UTILIZING
A VOLATILE RADIOACTIVE CHEMICAL
Filed Nov. 5, 1965    6 Sheets-Sheet 6
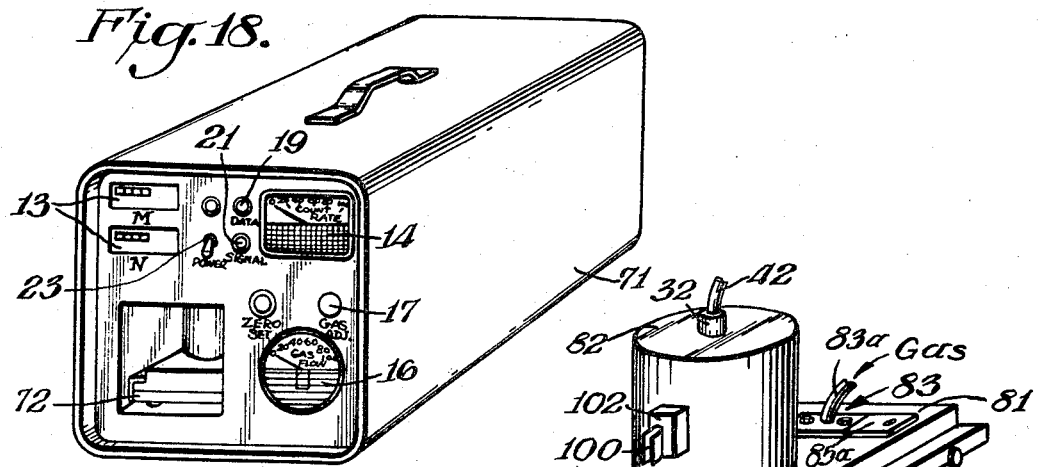
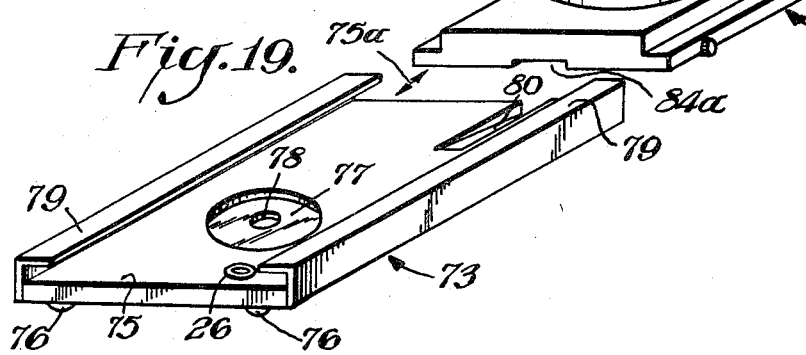
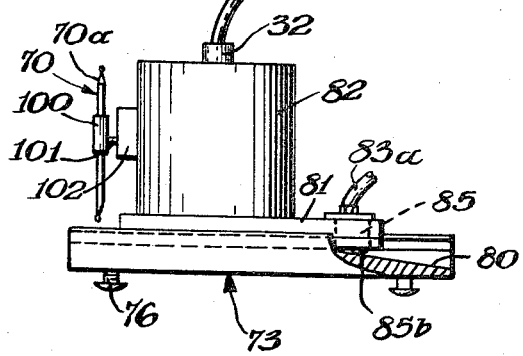 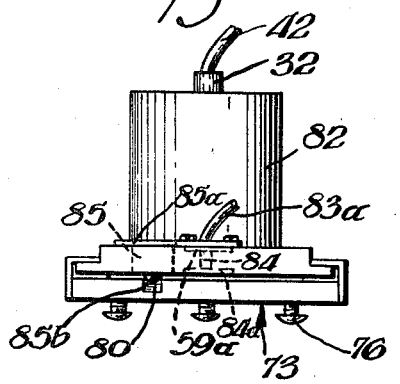
INVENTOR
John Lynde Anderson
BY C. W. Mortenson
ATTORNEY

United States Patent Office 3,412,247
Patented Nov. 19, 1968

3,412,247
MEANS OF DETECTION OF SURFACE CONTAMINANTS UTILIZING A VOLATILE RADIOACTIVE CHEMICAL
John Lynde Anderson, Orlando, Fla., assignor, by mesne assignments, to Ametek, Inc., a corporation of Delaware
Continuation-in-part of application Ser. No. 161,246, Dec. 21, 1961. This application Nov. 5, 1965, Ser. No. 506,566
17 Claims. (Cl. 250—83.3)

This invention relates to a new method of detecting contamination on surfaces and more particularly to the detection of non-volatile organic contamination on metal and other surfaces.

This case is a continuation-in-part of my application S.N. 161,246 filed Dec. 21, 1961 now U.S. Patent No. 3,297,874.

The rapid and quantitative detection of nonvolatile organic contaminants either on metal or other surfaces or within spaces confined by such surfaces, particularly contaminants which are present only in very small amounts, is not practicable using existing methods and techniques. Thus, a method in general use involves the process of thoroughly wetting a metal surface with a solvent for the contaminant, of recovering the solvent quantitatively and then determining the amount of contaminant dissolved in the solvent. This method, however, determines only material which is removed from the surface and does not determine material which is left on, or is adjacent to, the surface after the test is completed. While it is known that the cleanliness of a surface can be determined by use of radioactive materials, the prior art methods, as, for example, that of Dvorkovitz et al described in U.S. Pat. 2,968,733, are not adequate and not always operative, for the problem of contamination of metal surfaces often is a most serious one, particularly when the contamination may cause explosions or rapid, uncontrolled chemical reactions when in contact with other material for which the surface in its various forms is designed. For example, in handling liquid oxygen it is essential that the amount of organic contamination on the metal surfaces over which the liquid oxygen is standing or through which it is transferred must be kept to the irreducible minimum and must be quantitatively determined prior to permitting the liquid oxygen to come into contact with the metal surfaces involved, in order to insure maximum stability and safety. Testing procedures which introduce or leave contaminants behind must be avoided.

It is, therefore, an object of this invention to provide a new and useful method for the detection of contamination on surfaces. Another object is the provision of a method for the detection of non-volatile organic contamination on metal surfaces or within spaces confined by metal surfaces by a simple and economical method. A still further object is the provision of a method by which non-volatile hydrocarbon contamination on metal surfaces may be detected. Other objects will appear as the description of the invention proceeds.

These and other objects are accomplished in the present invention by applying a volatile radioactive labeled compound to a surface, by partially evaporating the radioactive labeled compound and at the same time evaporating substantially all of the solvent, if any, used to apply the labeled material, and by detecting the amount of radioactivity which is left on the surface being examined, the amount of remaining radioactivity after such evaporation retained on a previously scrupulously clean surface similarly treated being always less than that which is left on a contaminated similar surface and therefore the ratio of the amount of radioactivity on the contaminated surface to the amount on the previously scrupulously clean surface being a direct measure of the amount of contamination.

Another embodiment of my invention is accomplished by applying a volatile radioactive compound into the space enclosed by a surface, by partially evaporating the radioactive compound and at the same time substantially all of the solvent, if any, used to apply the labeled material, and by detecting the amount of radioactivity which is left retained within the space enclosed by the surface, the amount of radioactivity remaining after such evaporation from within the previously scrupulously cleaned space enclosed by a surface being less than that which is left within a contaminated space enclosed by a surface and therefore the ratio of the amount of radioactivity within the contaminated space enclosed by the surface to the amount within the previously scrupulously cleaned space enclosed by the surface being a measure of the amount of contamination.

More particularly my invention includes the process of applying a volatile radioactive labeled compound, preferably chemically compatible with the organic materials which are normally found on metal or similar surfaces or within spaces confined by such surfaces, to such a surface or to within spaces confined by such surfaces, of partially evaporating the radioactive compound after such application only to the extent that the radioactive compound would substantially completely evaporate from a previously scrupulously clean surface or from within previously scrupulously clean spaces enclosed by a surface, of determining the residual radioactivity, and thus of detecting the contaminant.

A preferred embodiment of my invention is achieved by applying a volatile radioactive labeled compound to the surface, by partially evaporating the radioactive labeled compound and at the same time evaporating substantially all of the solvent, if any, used to apply the labeled material, and by detecting the amount of radioactivity which is left on the surface being examined and therefore a measure of the amount of contamination.

This invention will be further understood by reference to the description and to the examples given below which are given for purposes of illustration only and are not to be taken as limitative. In the examples, any parts or percentages given are by weight unless otherwise specified.

EXAMPLE I

Ten parts of a solution of 2000 parts of trichloroethylene and 1 part of 1-decylbromide-1-$C^{14}$ containing a total of 20 microcuries of radioactivity is added to a stainless steel surface containing dispersed uniformly on the surface 20 micrograms of non-volatile hydrocarbon per square inch of surface area. A similar amount of the radiochemical solution is added to a scrupulously clean stainless steel surface of similar area. Evaporation of each solution-wetted area is carried out for a period of forty-five seconds with a slow stream of dry gaseous nitrogen. Detection of the residual radioactivity on each surface demonstrates that the originally contaminated surface exhibits twice the activity of that shown by the originally scrupulously clean surface.

EXAMPLE II

One thousand parts of tetrachloroethylene-$C^{14}$ containing 50 microcuries of radioactivity dispersed as liquid droplets in dry gaseous nitrogen is passed slowly through a 6 inch diameter scrupulously clean stainless steel tube containing a small amount of paper saturated with a non-volatile hydrocarbon wax. Following flushing of the entire stainless steel pipe with sufficient dry gaseous nitrogen to reduce the activity on the previously scrupulously clean surface so as to be virtually non-detectable over the background radiation, the paper saturated with hydrocarbon wax exhibits a significant and higher radioactivity level than does the adjacent metal surface.

EXAMPLE III

Three parts (0.1 milliliter) of a solution consisting of 8 milligrams of decyl bromide-1-$C^{14}$ of specific activity 0.62 mc./mM. (millicuries per millimole) in 25 milliliters of methylene chloride is added to the surface of a scrupulously clean glass plate and the rate of evaporation measured by recording the disappearance of radioactivity from the surface. As the solvent methylene chloride evaporates the counts per minute increases to a maximum and then rather sharply falls off and rapidly approaches the normal background when the radioactivity is measured by means of a thin window Geiger counter positioned approximately one half inch above the surface of the glass. The evaporation is controlled in part in this experiment by flowing over the surface of the glass plate a steady stream of clean dry nitrogen gas. The radioactivity as measured by the Geiger counter is recorded in counts per minute on a strip chart recorder. In this experiment background levels of radiation are reached in approximately 70 seconds. When an artificially contaminated similar glass plate to which 100 micrograms of crankcase grease has been added is treated similarly and the rate of evaporation observed under identical conditions of temperature and nitrogen gas flow, the rate of evaporation markedly decreases and in seventy seconds the radiation levels have decreased from a high of 700 counts per minute to approximately 200 counts per minute.

When a glass plate is contaminated with 250 milligrams of crankcase and all other conditions are held constant, the radiation levels decrease by only approximately 50 percent over the same time period.

Similar though not identical results are obtained when the surface under test is aluminum, polypropylene, nylon, and stainless steel.

EXAMPLE IV

When the surface being examined in Example III is an interior surface of a steel tank and the rate of nitrogen gas flow is markedly increased, the evaporation from a scrupulously clean surface is now substantially complete in 35 seconds and evaporation from a contaminated surface (100 milligrams of grease) is not substantially complete after sixty seconds.

EXAMPLE V

One hundred lambda (0.1 milliliter) of a low boiling petroleum ether solution containing 2 microcuries of nonanol-1-$C^{14}$ (specific activity of 2.0 mc./mM. per milliliter of solution) is added to a scrupulously clean glass plate and a stream of clean dry nitrogen gas is then directed onto the surface. The radioactivity in counts per minute measured one half inch above the surface by a Geiger-Mueller thin window tube ratemeter is recorded on a strip chart. Following evaporation of the solvent the residual nonanol-1-$C^{14}$ evaporated substantially to background (less than 50 counts per minute) within 30 seconds from a high of 1000 counts per minute.

When this experiment is repeated using a glass plate on which has been deposited 80 micrograms of crankcase grease the evaporative curve (as measured by the disappearance of radioactivity) shows a maximum of 1200 counts per minute and a reduction to 250 counts per minute after 50 seconds.

The slope of the evaporative curve obtained by expressing counts per minute against time in seconds at ten seconds from maximum is approximately 40 for the scrupulously cleans surface and only 20 for the contaminated surface.

Substitution of an aluminum surface for the glass plate does not materially affect the rate of evaporation under either condition.

EXAMPLE VI

In an experiment similar to Example V, the contamination introduced is 4 milligrams of shredded filter paper. Under similar conditions of temperature and gas flow, the evaporation rate is intermediate and decreases from a maximum of 1250 counts per minute to 200 counts per minute in 70 seconds.

EXAMPLE VII

Dry air at 50° C. is led slowly from the bottom up through a vertical glass tube two meters in length which tube contains a tetrachloroethylene solution in which has been dissolved three millicuries of 1,1,2,2-tetrabromoethane-$Br^{82}$ (specific activity of 3.0 mc./mM.) and held at 50° C. The resultant saturated gas containing as vapor both tetrachloroethylene and 1,1,2,2-tetrabromoethane-$Br^{82}$ is then led into a scrupulously clean 3 inch stainless steel pipe and valve assembly also held at 50° C. and into which has been introduced 100 mg. of machine oil at one flange position joining the pipe and a valve. Following detection of radioactivity in substantially the same concentration per unit volume of effluent gas as is observed in the inlet gas the flow is stopped and the pipe and valve assembly isolated. The assembly is then permitted to cool to ambient temperature, that is to about 30° C. Measured externally with a scintillation counter, radiation is detected along the length of the pipe and valve assembly and a somewhat greater amount of radiation is detected adjacent to the contamination. Dry purge air is then metered slowly into the pipe and valve assembly and the rate of evaporation of the condensed 1,1,2,2-tetrabromoethane-$Br^{82}$ into the purge gas is measured all along the pipe and valve assembly as the front of the purge gas progresses along the length. The rate of evaporation into the purge gas is observed to be similar throughout the pipe and valve assembly except in the area of the machine oil contamination where the rate is significantly lower.

Somewhat similar results are obtained when the evaporation is caused by evacuating the pipe and valve assembly and causing the condensed liquids to vaporize.

When these experimental conditions are observed in similar assemblies of glass, Monel, aluminum, and linear polyethylene, similar evaporative results are obtained. Small effects are sometimes observed for changing surface conditions and surface materials in that the rate of evaporation from the clean surfaces vary slightly but in each case the rate of evaporation is considerably lowered in the adjacency to the contamination.

When the experimental conditions are repeated except that the contaminant is (1) cod liver oil and (2) ivory soap, similar results are obtained.

EXAMPLE VIII

In an experiment similar to Example VII the location of the contaminant is likewise confirmed when the solvent is butanol and the radioactive material iodoacetic acid-$I^{131}$ and the contaminant 500 milligrams of proteinaceous residue.

EXAMPLE IX

In an experiment similar in radioactive material, solvent, temperature, surface, and nitrogen purge gas as in Example V, the presence of 10 milligrams of carbon back on a machined nylon surface is readily demonstrated in that the rate of evaporation is very much slower than from a clean nylon surface.

Example X

An aerosol package contains perfluorocyclobutane as propellant, 10.0 milliliters of methylene chloride and 50 microcuries of 1,1,2,2-tetrabromoethane-$C^{14}$ (specific activity 3.5 mc./mM.). When approximately one tenth microcurie per sq. in. is sprayed onto a clean machined brass surface of 10 square inch area and the solvent is evaporated under a steady stream of air at 30° C., the residual 1,1,2,2-tetrabromoethane-$C^{14}$ disappears at a rate which indicates virtually complete evaporation in a period of one hundred seconds, the radiation being detected with a thin window Geiger counter mounted one half inch from the brass surface.

When the brass surface is contaminated with cutting oil at a level of 10 milligrams per square inch and the aerosol application repeated and dry air is blown over the surface at the same rate, the rate of evaporation is slowed markedly and easily detectable residues of 1,1,2,2-tetrabromoethane-$C^{14}$ are observed even after 250 seconds.

EXAMPLE XI

Results somewhat similar to those obtained in Example X are observed where the aerosol package contains only perfluorocyclobutane and 1,1,2,2-tetrabromoethane-$C^{14}$; that is, the methylene chloride is eliminated, showing that additional solvents are not essential.

EXAMPLE XII

Fifty parts of a solution containing 0.1 microcurie of carbon 14 labeled tetrabromoethane (specific activity 85 millicuries per millimole) dissolved in 150,000 parts of trifluorotrichloroethane, removed from a sealed ampule of 3 mm. outside diameter and drawn to a standard capillary on each end, was added to a 1 inch length of a 55 denier acetate rayon yarn containing a standard finish which length was positioned on a stainless steel surface. The addition was such that the fiber surfaces were substantially wetted by the liquid. Immediately after the application of the radiochemical solution, a thin end window Geiger-Mueller detector, protected with a .15 mil "Mylar" shield, was positioned directly above the wet fibers and a constant flow of clean dry nitrogen passed over the sample and below the surface of the tube protection shield. Following evaporation of the solvent, the rate of evaporation of the radioactive labeled material was observed by plotting the counts per minute versus time and the areas under the evaporation curve measured by taking the total digital information obtained from the Geiger tube, analysing the data and expressing on a timed basis for sequential areas under the evaporation curve, as explained below. These areas provided the following numbers: 68, 57, 50, 46.

A similar determination made on identical fibers in the absence of finish provided similar number values of 15, 12, 9, 7. The higher numbers are a measure of the amount of finish.

When varying amounts of finish were applied to similar rayon fibers, the numbers obtained were always in a ratio relative to the amount of finish applied. Thus, this procedure can be used as an accurate measure of the amount of finish on fibers.

In a similar experiment the volatile solvent used was cyclopentane and the radiochemical was tridecane-$C^{14}$ with a specific activity of at least 40 millicuries per millimole. Similar, but not identical numerical results were obtained.

In another similar experiment, the radiochemical test solution used consisted essentially of the dimethyl ether of triethylene glycol $C^{14}$ dissolved in the volatile solvent diethyl ether. Similar but not identical results were again obtained. These experiments show that the amount of surface residue on the rayon fibers may be detected by this technique with different radiochemicals.

EXAMPLE XIII

Using the precision volumetric dispenser described herein in FIGURE 1, among others, a 20 lambda volume of radiochemical test solution containing one part of tetrabromoethane-$C^{14}$ dissolved in 60,000 parts of trifluorotrichloroethane was added dropwise to a flat, horizontal and clean silicon surface. Following the positioning of a suitable detector above and impingement of dry gas nitrogen onto the surface, the desorption rate from the surface was observed. Expressing the areas under the evaporation curve as a direct function of the digital information, and permitting the prior evaporation of solvent, only background radiation could be detected in four sequential periods. When the same surface was contaminated with 20 micrograms of oil and similarly examined, the numerical expressions were 35, 28, 24 and 22, thus detecting and measuring the contamination.

EXAMPLE XIV

In an experiment similar to Example XII, 1 inch of nylon monofilament having a standard processing finish on its surface was cut into one-eighth inch lengths and the eight pieces were positioned on a sample plate of glass which contained a standard concavity 5 mm. in depth and 25 mm. in diameter for each filament. Then 0.5 ml. of ethyl ether was added to the fiber located in the concavity and the short lengths of fiber were removed with a scrupulously clean pair of forceps. Following evaporation of the ethyl ether, 50 lambda of a solution containing 0.5 microgram of tetrabromoethane-$C^{14}$ in methylene chloride was added dropwise to the residue. Following evaporation of the solvent methylene chloride, the evaporative rate of the radioactive material was determined by passing a controlled flow of pure nitrogen gas at a rate of 1200 ml. per minute over the surface and between the surface and a thin end window G.-M. tube. The various discharges in the G.-M. tube were analyzed by the equipment shown herein and the counts per minute plotted against time on a strip chart recorder. The rate of evaporation of the radioactive material thus obtained was significantly lower than the rate observed when the same experiment was carried out on nylon monofilament which had been previously scrupulously cleaned of finish.

EXAMPLE XV

One cubic centimeter of ether containing 10 parts per million of non-volatile residue was evaporated into a glass planchlet similar to that used in Example XIV, and the non-volatile residue on the planchlet was permitted to resume ambient temperature. Then 8 lambda of a solution containing tetrabromoethane-$C^{14}$ dissolved in trifluorotrichloroethane was added to the planchlet and the volatile solvent evaporated. Subsequent measurement of the rate of evaporation of the radioactive tetrabromoethane-$C^{14}$ from the surface showed the presence of the non-volatile residue previously deposited from the ethyl ether. When the identical experiment was carried out using ethyl ether of scrupulous purity, the observed rate of evaporation was much faster and in fact under the conditions of the experiment, background levels were reached in a few seconds whereas background levels were reached only after several minutes in the case of the deposited residue.

EXAMPLE XVI

In an experiment similar to Example XV, the amount of non-volatile residue in a series of samples of trichloroethylene which had been obtained from washing the internal surfaces of piping used in pumping hydraulic oils showed that the rate of evaporation increased with the residues laid down from samples taken sequentially. This showed that the first samples contained higher amounts of residual oil and later samples lower amounts. By using this technique the efficiency of the cleaning steps and materials can be rapidly determined.

EXAMPLE XVII

Fifty parts of a solution containing tridecane-$C^{14}$ of specific activity 40 millicuries per millimole in 100,000 parts by weight of pentane is added to surface of a tin plate to which had been added by spraying 1.15 grams of oil per 62,000 square inches of surface. Following evaporation of the pentane the rate of desorption of the radioactive material from the surface and from the contaminant was observed by use of a thin end window G.-M. tube and counting system using a steady stream of filtered air as the evaporation agent. The rate of desorption or evaporation from the contaminated surface was significantly lower than when the similar procedure was carried out on previously cleaned tin plate. When the same type of test was run on several different spots on the same piece of tin plate, various decreased rates of evaporation were observed showing that the spraying technique employed for laying down the oil film did not provide uniform coverage of the surface. Several oils were tested including dioctyl sebacate and cottonseed oil.

In a similar experiment, a solution of tetrabromoethane-$C^{14}$ in trifluorotrichloroethane in 1:60,000 ratio by weight was used to prove the presence of 6 milligrams per square foot of stearic acid on aluminum foil. The evaporation rate was always significantly lowered by the presence of contaminant and the results of several spot tests showed a decided unevenness in amount of stearic acid on the surface.

EXAMPLE XVIII

Fifty lambda of a solution containing 0.5 microgram of tetrabromoethane-$C^{14}$ in trichlorotrifluoroethane and substantially no non-volatile residue was added, from a previously sealed 2 mm. (outside diameter) glass tubing, in which the solution formed a steady miniscus when inverted by breaking off first one end of the tube and then a second end to a concavity in a stainless steel planchlet on which had been deposited previously 10 micrograms of linseed oil followed by curing in an air oven for twenty minutes at 100° C. The results of observing the rate of evaporation using the equipment described herein showed values of 110, 92, 84, and 76 whereas the same determination in the absence of the linseed oil showed values of 60, 15, 7 and 4, respectively. When the test plate was cleaned in an ultrasonic cleaner for a period of eight minutes using trifluorotrichloroethane as solvent, a subsequent test showed that substantially all of the linseed oil had been removed when the values of 56, 14, 8, and 5, respectively were obtained. These values were obtained using the apparatus of this invention described below.

When the same test was performed with another ultrasonic cleaner, the results following the eight minute cycle showed values of 70, 24, 13, and 8 showing that the second ultrasonic cleaner did not function as well as the first one.

When the same test was performed with yet another ultrasonic cleaner, the results showed that this third cleaner barely cleaned the surface at all; that is, the results following cleaning were 90, 78, 69, and 62.

Thus, the method of observing comparative rates of evaporation on previously similarly contamined surfaces permits an accurate and instrumental evaluation of the efficacy of ultrasonic cleaners.

In still another experiment a mixture of decyl bromide-1-$Br^{82}$ and nonanol-1-$C^{14}$ is used as the radioactive element in order to effect preferential pick-up by contaminants varying in chemical composition. It is noted that this combination works well with contamination containing both carbohydrates and hydrocarbonaceous materials. Similarly, other mixtures of contaminants are treated with radio-active materials purposely compounded in mixtures to insure good pick-up by each individual contaminant in the composite impurity.

From the above it can be seen that in my invention a volatile radioactive labeled compound is used which preferably is compatible and miscible with the type of contaminant which it is desired to detect and to measure, and in general it is preferred that the radioactive labeled compound is chemically inert with both the surface and with the contaminant. In the event that the radioactive labeled compound selected is, in fact, reactive with the contaminant, it is necessary that the compound will be much less reactive with the surface itself so that after the evaporative phase of my invention, a difference in radioactivity will be observed. In addition, the labeled compound selected for a given surface or combination of surfaces will have a volatility which is normally less than the volatility of the particular solvent employed, if any. In any event the volatility of the radioactive labeled compound is such as to permit substantially complete evaporative conditions even when the surface is contaminated. Under these conditions the detection of residual radioactivity on the surface constitutes a positive demonstration that the contamination existed prior to the application of the test solution of the radiochemical.

The amount of radioactivity which is detectable is in general proportional to the amount of contamination which was originally present when the process of my invention is employed. The physical state and the chemical nature of the contamination also affect to some degree the amount of residual activity detected and the amount of radioactive labeled compound retained under the evaporative conditions. A small amount of contamination will cause the retention of only a small amount of residual activity whereas a large amount of chemically similar contamination will cause the retention of a relatively large amount of residual activity. The rate at which the solvent, if any, and the radioactive labeled compound are evaporated is not highly significant; however, the evaporative conditions are normally continued until substantially all of the solvent and the radioactive material would evaporate if no contaminant on the surface were originally present; that is, control conditions are met.

The type of contamination which is detected by my inventive process is that which is often found on metal surfaces. Such contamination may arise from cutting or threading oils, from greases and protective hydrocarbons, and in other ways. The particular radioactive labeled compound employed will determine in part the efficacy of the detection process and it is preferred that radioactive compounds be used which are compatible with hydrocarbons and other organic contaminants.

The particular radioactive labeled material employed in my invention is selected also for the type and energy of radiation emitted, for the chemical compatibility which the solvent used, if any, for the ability to be adsorbed on the surface of or absorbed within the contaminant and for such volatility as to enable substantially complete evaporation within a reasonable time from a previously scrupulously clean surface. The radioactive labeled compound is made radioactive by the presence of alpha, beta, or gamma emitting radioisotopes. In general for measuring the radioactivity immediately adjacent to the contamination, compounds containing soft beta or gamma emitters are used while compounds containing hard beta or gamma emitters are required when the radioactivity is detected through a metal surface.

A preferred class of radioactive labeled compounds consists of organic compounds which are labeled with at least one of the group of beta emitters consisting of carbon-14, sulfur-35, phosphorous-32, chlorine-36 and hydrogen-3. Another preferred class of radioactive labeled compounds consist of organic derivatives containing one or more strong gamma emitter.

Some typical classes of volatile radioactive labeled compounds which are well suited for my invention are the hydrocarbons decane-$C^{14}$, tridecane-$C^{14}$, decalin-$C^{14}$, isooctane-$C^{14}$, and nonane-$H^3$; halohydrocarbons such as decyl bromide-$C^{14}$, tetrachlorethylene-$C^{14}$, trichloroethylene-$C^{14}$, hexachloropropene-$C^{14}$, carbon tetrachloride-$C^{14}$, chloroform-$C^{36}$, and difluorotetrachlorethane-$C^{14}$, ethers and thioethers such as ethylene glycol diethylether-$C^{14}$, and dibutylthioether-$S^{35}$; and phosphorous compounds such as tripropylphospine and phosphorous tribromide labeled with phosphorous-32.

The radioactivity in my inventive process is detected by means of any suitable detector of radiation. For most purposes a Geiger-Mueller tube and associated equipment is acceptable and convenient. Portable instruments used to detect radioactivity inside of long and complex metal tubes have had to be designed for this purpose.

The surfaces examined by my inventive process may be almost any material used in commerce for construction of plates, pipes, valves, tanks, flanges, and the like. For example, metal, glass, fused ceramics, and plastic surfaces are all satisfactory and may be examined for the presence of contaminants. In general, the more porous the surface (that is, the greater the surface area) the less the differentiation between surface and contaminant with respect to retention of radioactive labeled material and therefore the less positive the absolute identification of contaminant. To illustrate, oil or grease is very readily detected on polished stainless steel but oil or grease on a surface prepared by compressing finely divided carbon black is more difficult to detect since the carbon black with a relatively high surface area adsorbs the radioactive labeled material in much the same way as the contaminant adsorbs it and the rate of evaporation from the compressed carbon black is nowhere near as rapid as from polished metal or glass. But by proper reference to the control the presence of the contaminant is detected as well as a fairly quantitative measurement of it. Knowing the nature of the surface, the operator of this invention will proceed accordingly.

It is apparent from this discussion that materials such as sand or finely divided iron oxide may be readily detected on the surface of machined steel using my invention provided a radioactive labeled material is selected which is adsorbed more strongly by contaminants, such as iron oxide, than by the machined surface, since the evaporative rate from the iron oxide is less than that from the machined steel, other conditions such as temperature and flow of gas over the surface being held constant.

Solvents such as tetrachloroethylene in Example VII and low boiling petroleum ether in Example V are not an essential part of this invention in its broadest aspects although in preferred embodiments solvents are used. Solvent functions are to increase the solubility, the rate of solution, and/or the adsorption or absorption of the radioactive labeled compounds on or in the contaminant to be detected. In addition the presence of the solvent tends to increase the efficiency of the deposition on all surfaces, as is shown in Example VII. Many solvents may be used such as tetrachloroethylene, low boiling petroleum ether, butanol, perfluorocyclobutane, methylene chloride, ethanol, acetone, formic acid, ethyl ether, and the like. Solvents with boiling points at least 100° C. less than the boiling points of the particular radioactive labeled material are used in order that appreciable residues of the radioactive labeled material are left over after substantially complete evaporation of the solvent.

In general, it is preferred to use a radioactive labeled material which has a boiling point at least 100° C. higher than the solvent boiling point in order to insure that, following the evaporation of the solvent, sufficient radioactive labeled material is left behind for ready detection particularly in the case of previously scrupuously cleaned surfaces. Therefore, materials with boiling points in excess of 100° C. are preferred when low boiling solvents are employed and in excess of 130° C. when higher boiling solvents are employed. When no solvents are employed in my inventive process, the boiling point of the selected radioactive labeled material should be sufficiently high so that facile determination of the rate of evaporation is possible.

When two or more types of contaminants may be encountered, it is of advantage to use two or more particular radioactive labeled materials of such a nature that one is absorbed more strongly by a first type of contaminant and so forth. Thus, when attempting to locate and detect contaminants such as hydrocarbon grease and proteinaceous material, radioactive labeled materials such as 1,1,2,2-tetrabromoethane-$Br^{82}$ and iodoacetic acid-$I^{131}$ may be used simultaneously in the same solvent or dispersant system. Also, the rate of evaporation of each may be determined independently of the other by means of suitable detection devices such as scintillation or solid state detectors coupled with channel analyzers so that the individual radiations of different energy levels are determined separately. This technique permits the detection of the location, the type, and the relative amount of each contaminant quickly and conveniently. Other counters which can be used include the Geiger counter and the proportional counter for beta and gamma rays. These various counters may be used externally or as probes moving within the enclosures being tested.

When using my inventive process, and particularly the aerosol method, many different types of propellants and/or solvents may be used. Thus, octafluorocyclobutane, dibromodifluoromethane, nitrogen, nitrous oxide, butane, and the like may be used. Normally, it is desired to use non-flammable materials, such as the polyhalogenated materials. Included among these are monofluorotrichloromethane, chloroform, carbon tetrachloride, dichloromethane, monochloromonoflouoromethane, 1,1-difluoropropane and 2,2,-difluoropropane, among others.

Since my inventive process depends on absorption or adsorption by the contaminant of the radioactive labeled material, it is important to insure that mixing of the radioactive labeled material with the contaminant be encouraged through use of the proper solvent, through providing a long enough time of contact prior to the encuragement of the evaporation, and by selecting the proper radioactive labeled material for the type of contaminant it is desired to detect.

In addition to the nature and amount of contaminant and the type of surface involved there are other facts which the operator of this invention will know or control in applying the principles of this invention. For example, the temperature and pressure affect the rate of evaporation and for greatest accuracy it is important that both be controlled closely. It is possible to carry out a series of reference studies so that in the event that either temperature or pressure cannot be controlled positively that reference to graphs or curves be made in order to correct for such variations. Detection systems such as Geiger counters, scintillation counters, and the like may be so constructed that temperature and pressure corrections are manually or automatically taken into account when the evaporative rate is determined. A further factor affecting the rate of evaporation is the amount, the velocity and type of gas flowing over the surface being examined. For highest accuracy the rate of gas will be accurately maintained so that evaporation from a scrupulously clean surface is always standardized as much as possible. Change of the rate of gas flow can be used to determine more accurately the amount of contamination under certain conditions and in general high rates of gas flow are used to cause the evaporation of relatively high boiling radioactive labeled materials while lower rates of gas flow are used with lower boiling materials. Proper shielding of the surface being examined is also important since extraneous gusts of wind or air will sometimes cause false indications of cleanliness. These factors are emphasized not by way of limitations on the broad applicability of this invention but to stress that proper controls or references be used in all measurements. While those skilled in the art will effect such controls, this emphasis may be a helpful remainder.

Although it is always possible to determine the rate of evaporation from a clean surface just prior to or just after the determination of the rate of evaporation from a contaminated surface, it is often of advantage to carry out the determination of the rate of evaporation from a scrupulously clean surface in a laboratory under more or less ideal situations and to use such a determination as a reference standard.

The sensitivity of the determination is a function of the amount of radioactive labeled material added in this inventive process. Thus, the higher the specific activity of the material, that is the amount of radioactivity per unit weight, the more sensitive is the test. Thus, if sufficient radioactivity for convenient detection is present in an amount as low as 1 microgram of material, dilution with 10 micrograms of contaminant will cause a very significant reduction in the rate of evaporation. However, if the same amount of radioactivity is present in 100 micrograms of radioactive labeled material, the dilution by 10 micrograms of contaminant will not greatly affect the rate of evaporation until a very significant amount of the radioactive labeled material has evaporated.

In general it is desirable to use specific activities in excess of 1.0 millicurie per millimole and preferably in excess of 3.0 millicuries per millimole. For example, 1,1, 2,2-tetrabromoethane-$C^{14}$ at a specific activity of 3.5 mc./ mM. has 0.01 microcurie in each microgram of material and this level is readily detectable. Thus, my inventive method provides a process for the detection of contaminants down to 1 microgram per square inch and even lower.

The processes of this invention are useful in many ways. They are used to detect the presence of hydrocarbon and other contaminants on the surfaces of many kinds and compositions, as for example, metal plates, valves, tanks and containers, pipes and tubes, and of other metal shapes. The residual hydrocarbon and other contaminants which are detected by the invention herein described are not in general determinable either qualitatively or quantitatively by prior art. The use of the invention herein described is especially important when the surfaces so examined are used for the storage or transfer of materials which react violently with the contaminants so detected since the process permits the determination not only of the level of contamination but it permits the establishment and determination of realistic levels of contamination to prevent the possibility of violent reaction.

As can be seen from the above the apparatus used in this invention comprises a means for applying a volatile radioactive material to the surface(s) being examined along with means for effecting evaporation of the said material and means for detecting radiation during the evaporation. The applying means places the radioactive material in contact with any contaminant and a gas is used to assist in the evaporation and this gas may be metered over the said surfaces at given or desired rates. Also, the apparatus includes an aerosol container for the radioactive material that contains a propellant.

This apparatus is more particularly set out below in the figures and description which follows all of which is given for illustrative purposes only and is not limitative.

In the figures

FIGURE 9 is similar to FIGURE 7 showing a different pumping means;

FIGURE 10 is a top view of another dispenser;

FIGURE 11 is a side elevation of the means shown in FIGURE 10;

FIGURE 12 is a schematic view of the dispensing means of FIGURES 10 and 11;

FIGURE 13 is an electrical block diagram of the analysis and control unit;

FIGURE 14 is a block diagram of the gas flow system;

FIGURE 15 is a block summary;

FIGURES 16 to 16C are illustrative experimental readings obtained with the apparatus of FIGURE 1;

FIGURE 17 is a side elevation of another dispenser of this invention;

FIGURE 18 is a pictorial view of an analysis/control unit and probe assembly contained in the same container;

FIGURE 19 is an exploded pictorial view showing how the unit and assembly slide apart;

FIGURE 20 is a side elevation showing the microswitch and a dispenser; and

FIGURE 21 is an end elevation of the probe assembly.

Figure 1:
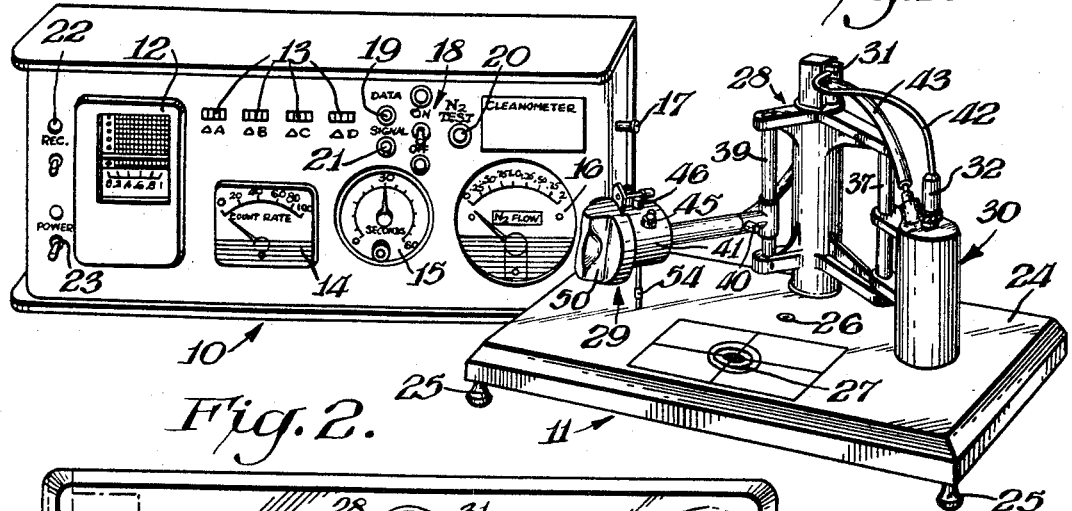
FIGURE 1 is a pictorial view of one analysis and control unit and the probe/dispenser/detector assembly used therewith.

Referring to FIGURE 1 the analysis and control section 10 has a gas supply and valving system permitting accurate and reproducible control of gas flow to the detector head 11. Also shown are a strip chart recorder 12, four programmed counters 13, a DC ammeter 14 used for expressing count rate, a preset timer 15 which is set to permit substantial evaporation of the solvent used in applying the radioactive test material prior to the measurement of the evaporative rate of the radioactive material itself and whose arbitrary value depends on the geometry of the test surface, temperature, pressure, rate of gas flow, and other factors, a pressure gauge 16 which measures gas flow, and a series of lights, switches and controls such as nitrogen adjust valve 17, sequencer on and off 18, data light 19, nitrogen test switch 20, sequencer signal light 21, recorder switch 22 and power switch 23. On the sides are other controls, not shown for convenience, such as power inlet, fuses, gas inlet, time base, zero set, gain, scale select, recorder gain and jacket and the tube and power connections to the dispenser assembly.

The probe assembly shown in FIGURE 1 includes a base plate 24 with adjustable legs 25 insuring stable and level conditions for testing, a bubble level detector 26, a target 27 on which the surface to be examined is positioned, a mechanical arm and bracket assembly 28 for rotating the dispenser and the detector to assure proper positioning over the test surface, a precision dispenser 29 which permits discharge of a metered amount of test solution without substantial change of titre, a detector 30 being a Geiger-Mueller tube 32, thin Mylar protective shield to reduce background build-up with provision for nitrogen or gas flow between the G.-M. tube and the surface being tested, and a microswitch 31 which turns on the gas flow and sequential operations when the detector is rotated and positioned over the surface under test.

Figure 2:
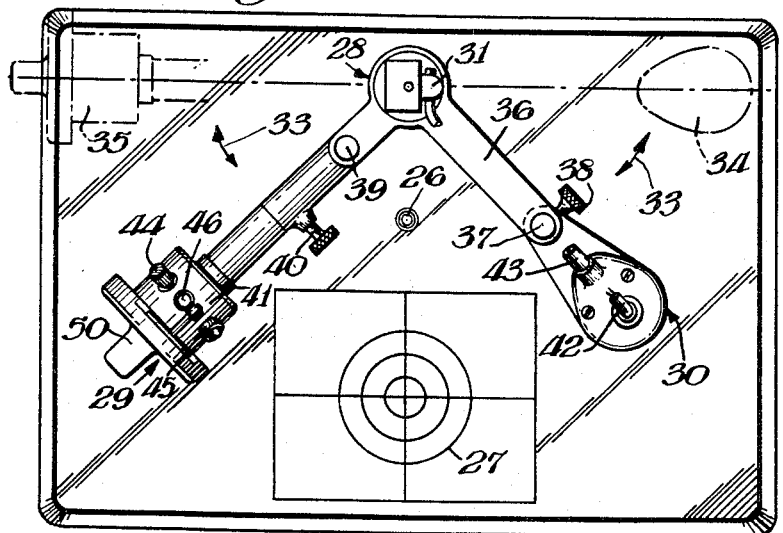
FIGURE 2 is a plan view of the said assembly shown in FIGURE 1.
Figure 3:
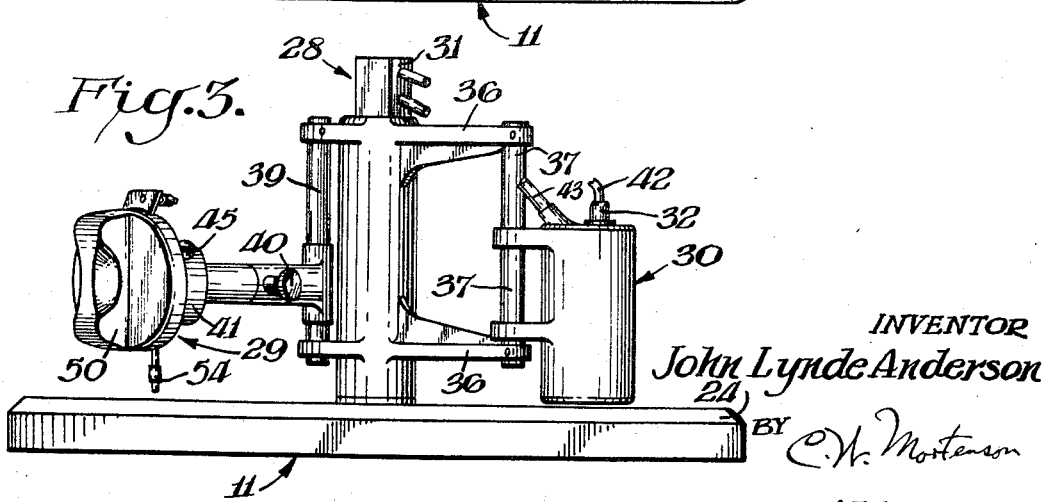
FIGURE 3 is a front elevation of said assembly.

In the plan view given in FIGURE 2 the rotation of the bracket assembly 28 is shown by arrows 33. It will be noted that when dispenser 29 is rotated to position it above target 27 to dispense radioactive material, the probe 30 will be in the position shown by dotted lines 34. Likewise after dispensing is effected, the dispenser will be moved to position 35, the rotation placing probe 30 directly above the center of target 27. The probe 30 is mounted on arms 36, shown also in FIGURE 3, so that it is pivotable on upright 37 and vertically adjustable by means of set screw 38. Similarly, the dispenser 29 is mounted on post 39 for vertical adjustment by a set screw, not shown for convenience, the set screw 40 being provided for rotation of the dispenser head 41. In FIGURES 2 and 3 the high voltage line 42 and the gas flow tube 43 are shown in broken form for clarity of the parts beneath.

With further reference to the rotation of dispenser head 41, it will be noted that there are three feeders to the head, these being supply reservoir 44, charge pump 45 and discharge pump 46. These are shown in FIGURES 2, 4, 5, 6 and 7, for example. In order to fill the supply bottle 44, the head 41 is rotated so that the bottle 44 is in the bottommost position and is vertical. It is then unscrewed from head 41, a suitable threaded attachment 47 being shown in FIGURE 7. This can, of course, be some other type of attachment as for example a threaded cap which fits over a plain bottle and screws onto the internal threads contained in or held by the head. In any event, the bottle 44 is removed, is filled with the radiochemical 48, shown in FIGURE 7, placed back into position in the head 41, and this is then rotated and locked into position by means of set screw 40. This places the reservoir 44 in the position given in FIGURE 2 or 7.

Figure 4:
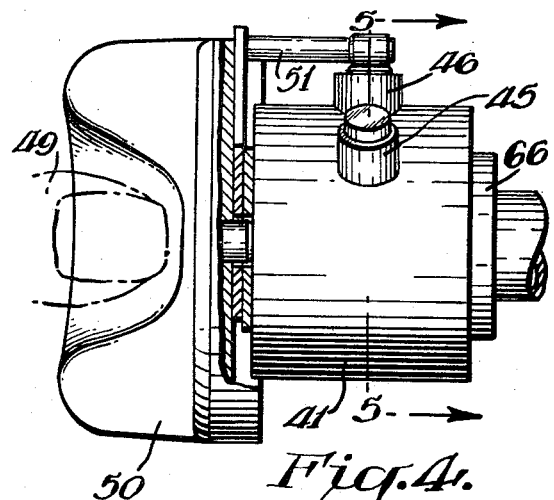
FIGURE 4 is a side elevation of the dispenser in said assembly in dispensing position.
Figure 5:
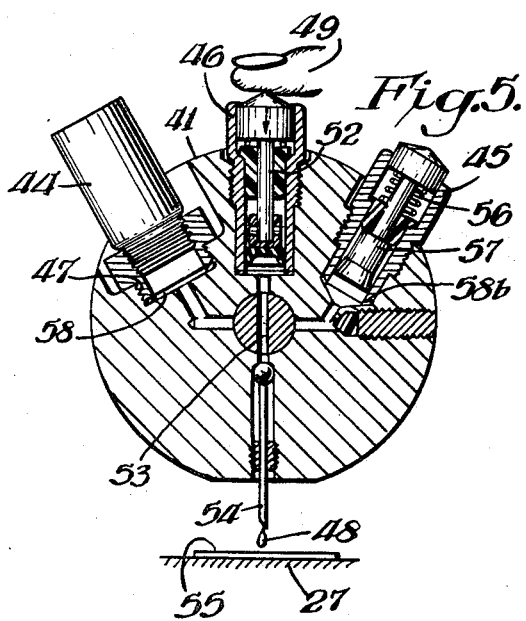
FIGURE 5 is taken on line 5—5 of FIGURE 4.
Figure 8:
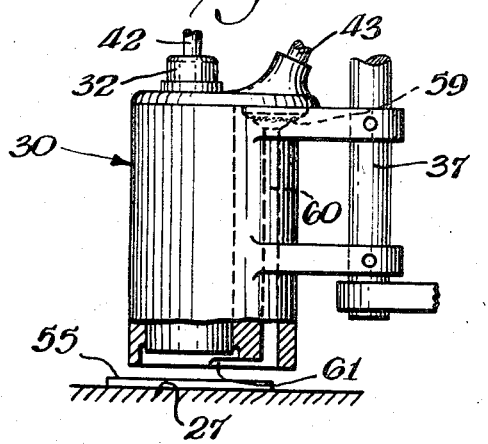
FIGURE 8 is a side elevation of a detector partially broken away to show the gas flow means.

In FIGURE 4 the dispenser is shown in discharge position having been rotated by the user 49 who turns knob 50. Upon this rotation rocker arm 51 contacts discharge pump 46. This pump can also be operated manually as shown in FIGURE 5. Depression of the plunger 52 forces the radiochemical contained in passageway 53 out through needle discharge 54 onto the surface 55 located on target 27. Before describing the evaporation which is then effected, the function of the dispenser will be further described to explain its loading.

Figure 6:
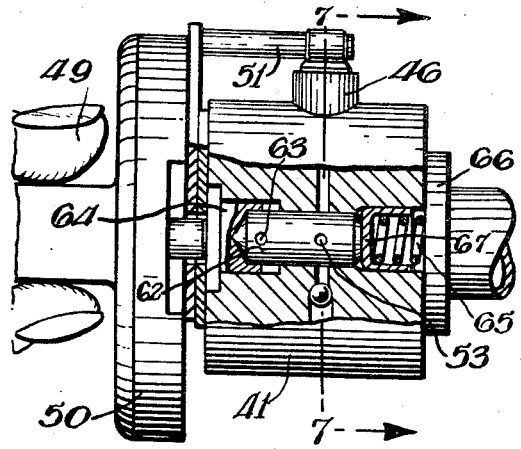
FIGURE 6 is a side elevation, partially broken, in charge or loading position.
Figure 7:
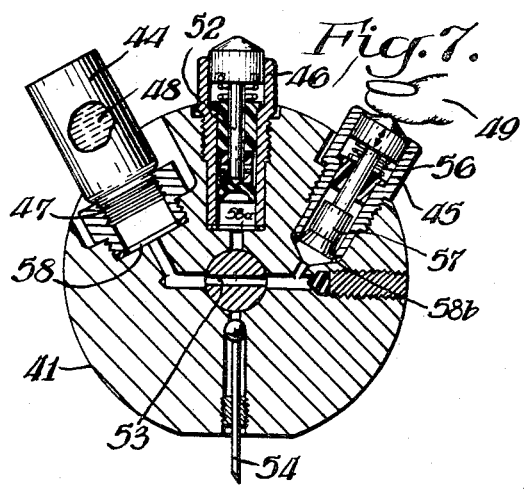
FIGURE 7 is taken on line 7—7 of FIGURE 6.

With the bottle 44 in the position shown in FIGURE 7 by the user's having rotated the knob 50 from the position shown in FIGURE 4 to the position given in FIGURE 6, it can be seen that the passageway 53 is now lined up with the bottle 44 and the charge pump 45. Thus, when the user 49 depresses or activates this pump, air in it and in passageway 53 is forced up into the bottle. When the pressure is removed, springs 56 force piston 57 back up and into the vacuum created flows radiochemical 48. Thus, it can be seen that containers are provided which are areosol containers which contain a radiochemical, a solvent and a propellant. The system is sealed by poly(tetrafluoroethylene) gaskets 58, 58a, and 58b. Thus, the user having discharged the radiochemical is again ready to align passageway 53 with the passageways of discharge pump 46 and needle 54.

With the radiochemical 48 in contact with the test matter on surface 55, the head unit 29 is replaced by probe 30. As this is done, the microswitch 31 closes and gas begins to flow through tube 43. This passes through filter 59 and then tube 60 downwardly and then out through an appropriate nozzle or exit 61 so that the gas flows between the bottom of the probe and the surface being examined. This, of course, effects removal by evaporating of radiochemical. Present directly above the surface is the G.-M. tube 32 which, being electrically activated by the turning of power switch 23, begins detecting the radiation and the changes therein due the evaporation, and these changes are converted into measures of the rate of evaporation by the analysis unit 10 and particularly by the count rate 14, recorder 12, if used, and the $\Delta A$, $\Delta B$, $\Delta C$, and $\Delta D$ counters 13.

In FIGURE 9 is shown a simplified dispenser having a bellows pumps 46a and 45a in place of 46 and 45, respectively.

Another embodiment is given in FIGURES 10, 11 and 12 which employs a stopcock of a construction different than that used in the embodiments shown in FIGURES 4–7. In FIGURE 6 the passageway 53 is a polished drilling in a poly(tetrafluoroethylene) cylinder 62 which is mounted by means of pin 63 to a brass fitting 64 which is in turn attached to knob 50 to be turned with when it turns. The spring 65 is held in place by member 66, and it bears against cup 67 which in turn urges cylinder 62 so that passageway 53 is always ready for alignment. Therefore, simpler arrangement is given in FIGURES 10–12 which also affords the advantage of flushing the metering system.

This embodiment uses stopcock 62a which is tapered, as shown in FIGURE 12, to assure alignment and proper seating. It is also connected to knob 50 and turns with it. In the position shown the oblique passageway 53a is connecting the passageway 44a to supply bottle 44 with the passageway 45b going to pump 45a, shown in FIGURES 10 and 11. By suitable rotation of knob 50, passageway 53a will align passageway 69a from solvent supply bottle 69 (FIG. 10) with passageway 68a leading to pump 68. Thus, after one has delivered radio-chemical through needle 54, he can draw clean solvent which contains no radiochemical from supply 69 and flush out the passageways.

As shown in FIGURE 17, a disposable dispenser is provided comprising a sealed container 70 having breakable ends 70a and 70b. While this container can be made of a variety of materials including metal, plastics and ceramics, glass is preferred. The containers are charged with a standard volume 70c of a radiochemical in a solvent. These are reproducibly made and charged to insure optimum reproducibility in testing. This dispenser can be used instead of dispenser 29, being hand held or held by a clip. In use, the ampule is shaken to get all the liquid into the bottom and then the other end, say 70a, is broken off, and the ampule is turned upside down. End 70b is then broken off and the liquid 70c flows out onto the desired surface. Since the ampules are of standard small capillary glass tubing, the inside diameters are from about 1 mm. to 2.5 mm., with diameters of less than 2 mm. being preferred. In any event, the hold-up of liquid is uniform and the amount dispensed is adequately constant.

As discussed above soft beta emitters are preferred and solvents which boil at least 100° C. below the boiling point of the radiochemical are used, it being preferred to have at least a 150° C. differential. Thus, solvents having boiling points below about 75° C. and emitters having boiling points of at least 200° C. are preferred. The solvent is present in an amount at least 5,000 times the amount, by weight, of the radiochemical in order to get reproducible volumetric measurements for constancy of radiochemical dispensing. Of course, much larger ratios, for example, 1 part of emitter in 100,000 parts of solvent, can be used. Of the emitters C-14, tritium-3 and sulfur-35 are preferred.

It is most important to use very highly purified test solutions. While bottles 44 and dispenser 41 are very useful and meet this important criterion, the person doing the testing can inadvertently contaminate the test solution in the filling and dispensing procedures described. Therefore, the dispenser 70 is a very definite advance, for purity is built-in and the container, a very inexpensive article, is not used again. Thus, dispensers 70, which can be charged with a variety of test solutions all standardized, afford simple, efficient dispensing.

In FIGURE 18 there is shown an embodiment of this invention which is highly adaptable to the use of dispenser 70. Contained on the front of portable cabinet 71 are gas flow indicator 16, count rate meter 14, gas adjusting valve 17, data light 19, signal light 21, power switch 23, counter 13, and access door 72, shown open. Within the container 71 and located behind door 72 are removable probe assembly comprising the base 73 and the G.-M. tube unit 74.

As seen in FIGURE 19 the base 73 contains a platform 75 having adjustable legs 76, generally three, the third at rear center being shown in FIGURE 21, and level bubble 26. Concave section 77 receives and holds test surfaces 55 which are omitted to show the small drilling 78 that goes completely through platform 75 permitting the insertion of a small rod from the bottom of 75 to push out the test surfaces 55 after the testing is finished. Rails 79 are present to act as guides for the G.-M. tube unit 74 which slides in and out of operative position above platform 75 as shown by arrow 75a. Also present is recessed track 80 in which a microswitch rides as unit 74 is being slid forward to get the G.-M. tube 32 over a test surface 55 placed in cavity 77. When the G.-M. tube reaches that position the spring loaded switch closes the circuit and starts the analysis sequence.

FIGURE 20 shows the G.-M. tube assembly 74 in a side elevation position and in position on base 73. The G.-M. tube 32 is contained in holder 82 held on platform 81. Behind the G.-M. tube is located gas inlet adapter 83 screwed into platform 81 and holding in place gas inlet filter 59a, shown in FIGURE 21, which connects via tube 83a to a gas source not shown for convenience and generally located in container 71. The exit end of filter 59a connects with a duct 84 in the bottom of platform 81. This duct connects in turn with a recess 84a in platform 81 directly beneath the G.-M. tube. Thus, when the G.-M. tube 32 is positioned directly above the test surface located in cavity 77, the gas goes through ducts 84 and 84a and sweeps the test surface in cavity 77. The microswitch 85 is held in place by cover plate 85a and is actuated by element 85b, generally a retractable wheel, which rides in track 80. Upon reaching the test position, this element 85b has been pushed sufficiently to close the desired circuit.

The container 82 also serves as a holding means for dispenser 70. Clip 100 is pivotally mounted on element 101 held by bracket 102 to container 82. As shown in FIGURE 20, the dispenser, after it has been well shaken to get all the liquid into the bottom end, is placed in clip 100. The top end 70a is then broken off and with dispenser 70 directly above the surface to be tested which has been placed in holder 77, the tube is up-ended, and with the sealed bottom end now at the top it is broken off and the liquid is allowed to run onto the surface. Unit 74 is then pushed into the final position that activates microswitch 85, and the analysis is begun and made.

An electrical circuit is shown in FIGURE 13. The power source 86 is generally the conventional 60 cycle AC 115 volt source and is fed to transformer 87 whose secondaries provide high voltage AC and three low voltage sources. Through use of a standard diode bridge and filter circuit 88 the AC current provided by the transformer is converted to 460 volt D.C. current which is fed to the G.-M. tube 32. The three standard low voltage converters 89a, 89b and 89c provide 12 volt D.C. current, and these currents are used to operate the basic electronic circuitry which comprises amplifier 90, monostable circuit 91, amplifier and data light circuit 92, electronic counter and amplifier 93 and rate meter circuit 94. The output of the G.-M. tube 32 is fed to amplifier 90 and the amplifier spikes are fed to unit 91 where they are converted to square wave signals. These are then fed in part to the rate meter circuit 94 which activates meter 14 and recorder 12, if used. The other portion of the square wave supplied by 91 are fed to the amplifier and data light 92 which activates data light 19 and counter/amplifier 93. A function of the counter is supplied through the cyclic timer 95 to the electromechanical counters 13. The circuitry shown in FIGURE 13 may be used for both embodiments shown in FIGURES 1 and 18.

FIGURE 14 is a block diagram of the gas or nitrogen supply system. A source 96 feeds the gas through a solenoid valve 97, present in the embodiment of FIGURE 1, but not in that of FIGURE 18. This valve is actuated by microswitch 31 or test button 20 shown in FIGURE 1. The gas is then fed through an adjustable needle valve 17 and through a calibrated orifice 98 whose pressure drop is measured by meter 16 and from there through filter 59 (or 59a) to the annual space between test surface 55 and the bottom of G.-M. tube 32.

In summary, FIGURE 15 shows power source 86 and gas source 96 being fed into analysis and control unit 10 (or 71). The high voltage supply 42 to the G.-M. tube or probe assembly 11 or 11a with gas supply 43 and connectors 99 for synchronizing microswitch 31 (or 85).

The various parts are readily available or assembled from commercially available parts or units. For example, recorders 12 are available from Rustrak Instruments Co., Inc., Manchester, N.H., Model 88 being applicable. Constant rate meters 16, such as Model 1931FS-100 μa. can be obtained from Weston Instruments, Inc., of Archibald, Pa. The Amperex Electronics Corp. of Hicksville, L.I., N.Y. supplies G.-M. tubes 32 as, for example, its Model 18526 which is readily modified as described previously. A cyclic timer 95 which may be used is obtainable from the Cramer Division of Giannini Controls Corp. at Old Saybrook, Conn. Also of that address is the Bristol Division of The Vocaline Co. of America which supplies times 15, for example, Model 6210-30S-B1. Filters 59 or 59a can be obtained from the Millipore Filter Corp. of Bedford, Mass., and suitable gas flow gauges are available from F. W. Dwyer Mfg. Co. of Michigan City, Ind. as, for example, its Model 2001. The use of transformers, diodes, resistors, capacitors, transistors and the like is, of course, well-known. Further, it is to be appreciated that certain elements may be eliminated, provided that the apparatus affords the control of evaporation of gas flow coupled with the accurate counting or measuring of radioactivity afforded by this invention.

In FIGURES 16–16c are shown typical numerical values on counters 13. FIGURE 16 shows background—that is, numbers normally obtained on surfaces prior to the addition of test solution. Those in FIGURE 16a are for a relatively clean surface upon testing. If such a surface is contaminated by a mere finger print smudge, the numbers obtained are substantial as shown in FIGURE 16b. If a successful attempt is made to remove the fingerprint, then values like those in FIGURE 16a are again obtained but if the removal is not successful, as by wiping with a dry cloth, then intermediate values like those in FIGURE 16c may be obtained. These simple experiments demonstrate efficacy of the apparatus and methods of this invention. Also, these values represent a function of sequential areas under the evaporation curve which is obtained by recording the count rate on a strip chart recorder; the curve thus obtained is the evaporation curve.

While the invention has been disclosed herein in connection with certain embodiments and certain structural and procedural details, it is clear that changes, modifications or equivalents can be used by those skilled in the art; accordingly, such changes within the principles of this invention are intended to be included within the scope of the claims below.

I claim:

1. As a new composition of matter a mixture of chemicals contained in a pressure vessel which mixture can be ejected from said vessel as desired and which mixture comprises an aerosol propellant and a radioactive labeled material in the presence of a solvent which has a boiling point at least 100° C. below that of said radioactive material and in which said radioactive material is soluble.

2. A composition in accordance with claim 1 in which said radioactive material is a beta emitter.

3. A composition in accordance with claim 2 in which said beta emitter is carbon 14.

4. Apparatus for detecting contamination on surfaces which apparatus comprises means for applying a radioactive material to any contamination on said surfaces; means for passing a gas over the resultant modified surfaces; and means for measuring the rate said radioactive material leaves the said contamination.

5. Apparatus in accordance with claim 4 which includes means for metering the said gas over the said surfaces.

6. Apparatus in accordance with claim 4 in which the said means for applying the said radioactive material comprises an aerosol package containing the said radioactive material and containing a propellant.

7. Apparatus for examining surfaces which apparatus comprises means for applying a material of low volatility to said surfaces; means for passing a gas over the resultant modified surfaces; and means for measuring the rate said material leaves the said surfaces.

8. Apparatus in accordance with claim 7 in which said applying means includes a sealed container having therein a known, reproducible amount of said material of low volatility.

9. Apparatus in accordance with claim 7 in which said means for passing said gas includes a means for reproducibly regulating the gas flow.

10. Apparatus in accordance with claim 7 in which said measuring means includes a means for expressing the amount of said material leaving the said surfaces in terms of numbers in a timed relationship.

11. Apparatus for detecting contamination on a surface which apparatus comprises means for storing a standard amount of a radioactive labeled material in a sealed, readily opened container; means for dispensing said amount onto or into a surface to be tested; means for detecting the amount of said radioactive material held by said surface; means for passing a gas over the said surface; and means for indicating the rate at which said radioactive material leaves said surface while said gas is passing over said surface.

12. Apparatus in accordance with claim 11 in which said storing means comprises a small, sealed glass tube.

13. Apparatus in accordance with claim 12 in which said tube contains an amount of radioactive material having a level of activity which is less than 1 microcurie.

14. Apparatus in accordance with claim 12 in which said tube contains a solvent for said radioactive material which solvent has a boiling point at least 100° C. below that of said radioactive material.

15. As a new composition of matter, a volatile mixture comprising a volatile radioactive chemical contained in a solvent that has a boiling point at least 100° C. less than the boiling point of said radiochemical, said radiochemical having a specific activity at least of 3.0 millicuries per millimole and said mixture having substantially no non-volatile residues.

16. A composition in accordance with claim 15 in which one part of said radiochemical is dissolved in at least 60,000 parts of solvent.

17. A composition in accordance with claim 15 in which said radiochemical has radioactive carbon atoms.

References Cited

UNITED STATES PATENTS

| | | | |
|---|---|---|---|
| 2,769,913 | 11/1956 | Mazzagatti | 250—43.5 |
| 2,999,162 | 9/1961 | Fearon | 250—106 |
| 3,045,116 | 7/1962 | Gant | 250—106 |
| 3,113,007 | 12/1963 | Rosinski et al. | 252—305 X |
| 3,133,025 | 5/1964 | Walker et al. | 252—301.1 |
| 3,150,050 | 9/1964 | Safrin et al. | 222—394 X |

OTHER REFERENCES

Super Sleuths Trace Flow of Injected Gas: by Welge, from the Oil and Gas Journal, Aug. 29, 1955; pp. 77, 78 and 79; 250–106T.

ARCHIE R. BORCHELT, *Primary Examiner.*